July 17, 1956  H. A. ORTEGREN  2,754,635
MACHINE FOR END-GRINDING TAPERED ROLLERS
Filed Oct. 6, 1952  6 Sheets-Sheet 3

INVENTOR.
Herman A. Ortegren
BY Barthel + Bugbee
Attys

July 17, 1956    H. A. ORTEGREN    2,754,635
MACHINE FOR END-GRINDING TAPERED ROLLERS
Filed Oct. 6, 1952    6 Sheets-Sheet 4
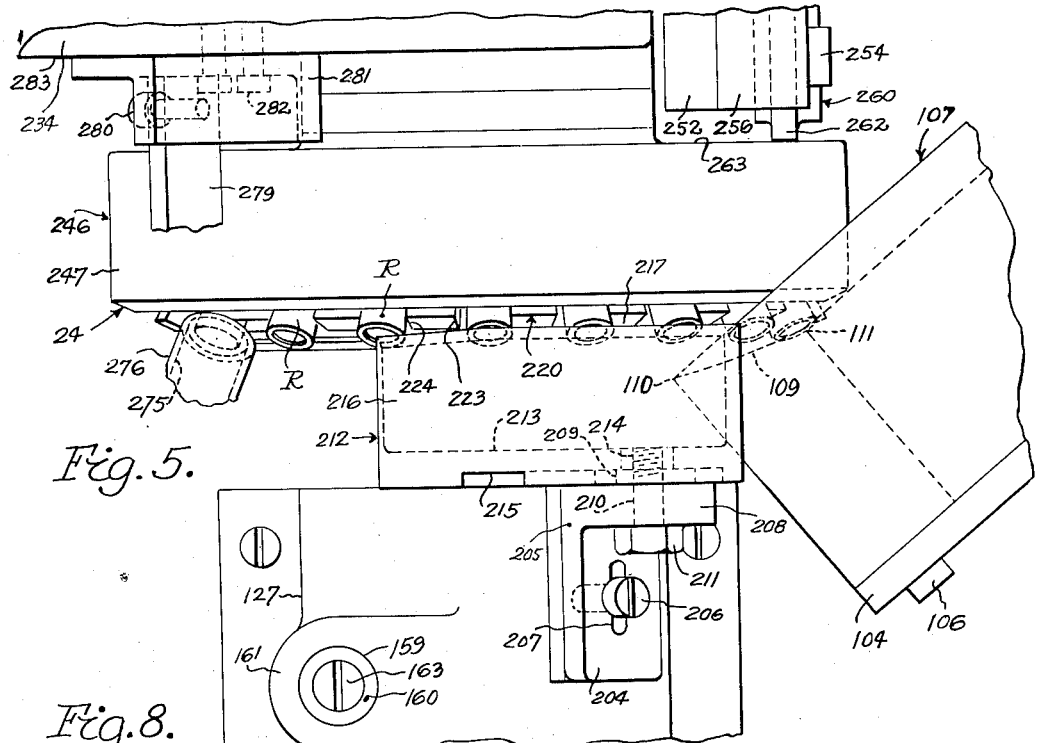
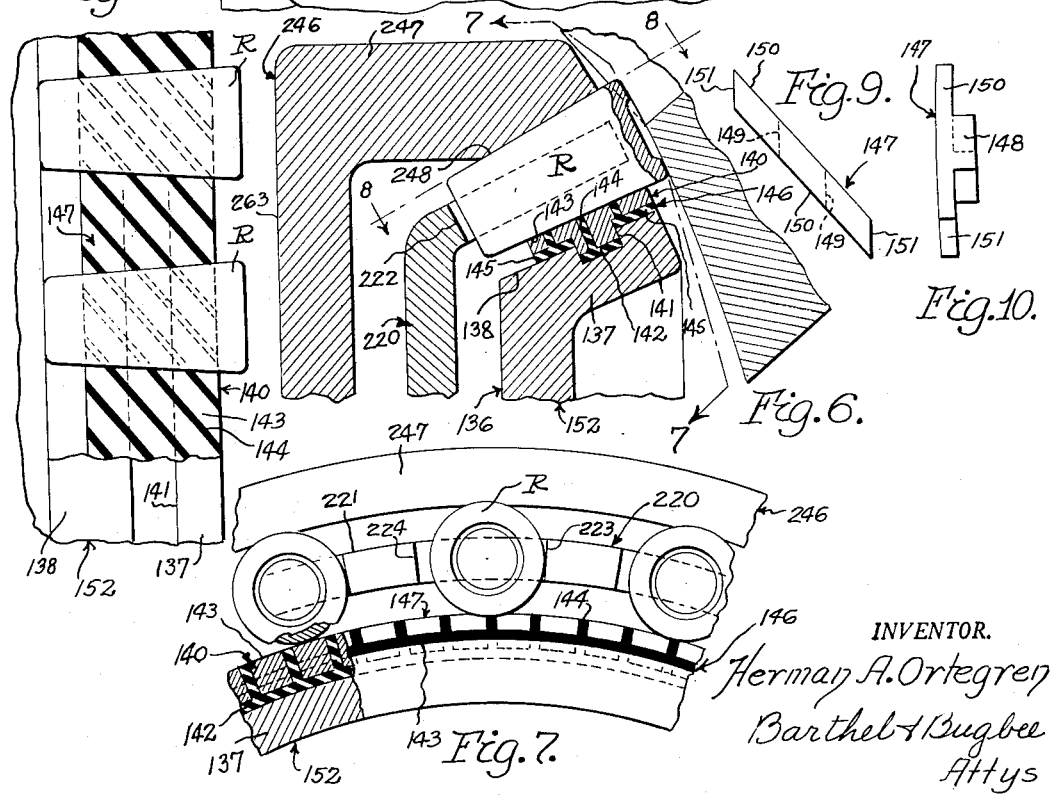
INVENTOR.
Herman A. Ortegren
Barthel & Bugbee
Attys July 17, 1956   H. A. ORTEGREN   2,754,635
MACHINE FOR END-GRINDING TAPERED ROLLERS
Filed Oct. 6, 1952   6 Sheets-Sheet 5
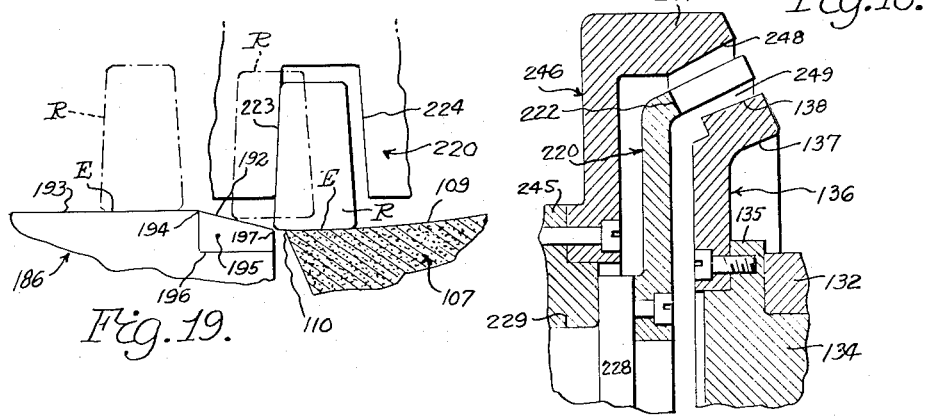
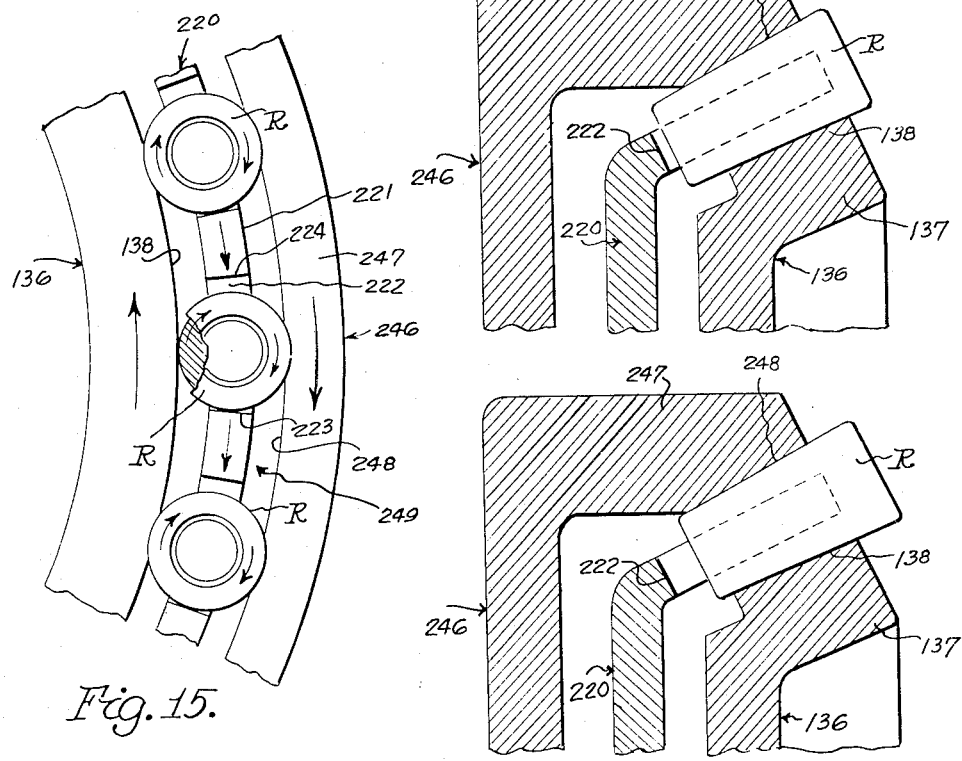
INVENTOR.
Herman A. Ortegren
BY
Barthel & Bugbee
Attys July 17, 1956  H. A. ORTEGREN  2,754,635
MACHINE FOR END-GRINDING TAPERED ROLLERS
Filed Oct. 6, 1952  6 Sheets-Sheet 6

INVENTOR.
BY Herman A. Ortegren
Barthel & Bugbee
Attys

United States Patent Office 2,754,635
Patented July 17, 1956

2,754,635

MACHINE FOR END-GRINDING TAPERED ROLLERS

Herman A. Ortegren, Grosse Pointe, Mich., assignor, by mesne assignments, to Federal-Mogul-Bower Bearings, Inc., Detroit, Mich., a corporation of Michigan Application October 6, 1952, Serial No. 313,215

14 Claims. (Cl. 51—134)

This invention relates to bearing roller grinders and, in particular, to tapered roller end grinders.

One object of this invention is to provide a centerless end grinder for tapered rollers which will grind substantially the same amount off the ends of tapered rollers regardless of the variation in diameter of the rollers within certain limits.

Another object is to provide such an end grinder which will operate continuously and which will automatically position the rollers relatively to the grinding wheel and which will automatically push the rollers away from the grinding wheel immediately after their ends have been ground, and discharge them by gravity.

Another object is to provide such an end grinder wherein the rollers to be ground are held between outer and inner wheels having tapered or conical surfaces, and driven by one of these wheels while held in a notched third wheel rotatably mounted between the outer and inner wheels.

Another object is to provide such an end grinder wherein one of the wheels is a pressure wheel and the other wheel is a driving wheel, one of the wheels being yieldable to permit widening the gap slightly between the wheels so as to accommodate rollers of somewhat varying diameters, means being provided for forcibly pushing the rollers into this gap in such a manner as to cause the ends of the rollers to be ground to project substantially the same distance outward from the wheels and therefore to cause the grinding wheel to grind off substantially the same amount on the ends of all rollers, even though the rollers vary somewhat in their diameters.

Another object is to provide such an end grinder wherein a supporting roll is provided for one of the wheels in order to prevent deflection of the periphery of that wheel beyond a predetermined permissible amount in accommodating rollers of slightly varying diameters.

Another object is to provide such an end grinder wherein the grinding wheel is pivotally mounted to swing about an axis which runs through one edge of the grinding surface of the grinding wheel.

Another object is to provide such an end grinder wherein the pressure wheel against which the rollers are crowded by the driving wheel is provided with a yieldable peripheral surface which is capable of being deflected slightly by rollers of larger than standard diameters, thereby adapting the machine to the end grinding of a large variety of rollers without readjustment.

Another object is to provide such an end grinder wherein the rollers to be ground are automatically held down by the forces exerted in the operation of the machine with consequent uniformity of end grinding resulting therefrom.

Another object is to provide such an end grinder which is quickly and easily readjusted to accept rollers of a different taper from the rollers previously ground, thereby adapting the same machine to widely varying conditions of manufacture.

Another object is to provide such an end grinder wherein the rollers to be ground are driven by one wheel with an internally-tapered periphery while urged against another wheel with an externally-tapered periphery and at the same time are held in a wheel with a notched periphery, the notches receiving and holding the rollers during grinding in such a manner that the edge of the notch serves as a rest against which the side of the roller rotates while its end is being ground.

Another object is to provide such an end grinder the size of which may be kept within small dimensions regardless of the radius of curvature, however large, to be ground upon the ends of the rollers.

Another object is to provide such an end grinder wherein the amount of stock to be ground off the ends of the rollers may be accurately controlled and varied as desired.

Another object is to provide an end grinder where the wheel is virtually self-dressing, that is, as the work passes over the end of the wheel, the full face of the wheel is being worn down as the wheel rotates.

Other objects and advantages of the invention will become apparent during the course of the following description of the accompanying drawings, wherein:

Figure 5 is an enlarged fragmentary top plan view of the roller intake guide mechanism for pushing the rollers into the gap between the driving wheel and pressure wheel;

Figure 6 is an enlarged fragmentary horizontal section at the central portion of Figure 2;

Figure 7 is an enlarged fragmentary front elevation of the rollers in the gap between the driving wheel and pressure wheel with a portion of the pressure wheel in section to show the resilient construction thereof, taken along the line 7—7 in Figure 6;

Figure 8 is a fragmentary approximately vertical section taken along the line 8—8 in Figure 6, showing the resilient construction of the pressure wheel periphery;

Figure 9 is a front elevation of one of the roller supporting bars shown in Figures 6 to 8 inclusive;

Figure 10 is a side elevation of the roller supporting bar shown in Figure 9;

Figure 11 is a top plan view, partly in section, of the driving wheel, roller holder and pressure wheel;

Figure 12 is an approximately horizontal section taken along the arcuate line 12—12 in Figure 1, showing the lower roller guide mechanism for forcibly withdrawing the roller from contact with the grinding wheel after grinding;

Figure 13 is an approximately vertical section through the mechanism of Figure 12, taken along the line 13—13 in Figure 1;

Figure 14 is an approximately vertical section taken along the line 14—14 in Figure 1, showing the upper roller guide mechanism for forcibly pushing the rollers into the gap between the driving and pressure wheels immediately before grinding;

Figure 15 is a fragmentary side elevation of the roller driving and pressure wheels and the roll holder, showing the rotational relationships therebetween and the manner in which the roller is urged against one side of the notch in the roller holder;

Figure 16 is a fragmentary diagrammatic top plan view showing the position of a large diameter roller in the gap between the driving wheel and pressure wheel before the roller is subjected to the action of the upper guide mechanism of Figure 5;

Figure 17 is a fragmentary diagrammatic top plan view similar to Figure 16 but showing the position of a small diameter roller in said gap;

Figure 18 is an enlarged fragmentary horizontal section similar to Figure 6 but showing a modification wherein the pressure wheel has a plain or non-resilient periphery;

Figure 19 is a fragmentary diagrammatic approximately vertical section similar to Figure 12, but in a slightly different plane, showing the successive positions of a roller immediately before, during and after withdrawal from the grinding wheel;

Figure 20 is a fragmentary vertical section through the lower end of the backstop lever shown in dotted lines in Figure 1;

General problem and solution

Figure 1:
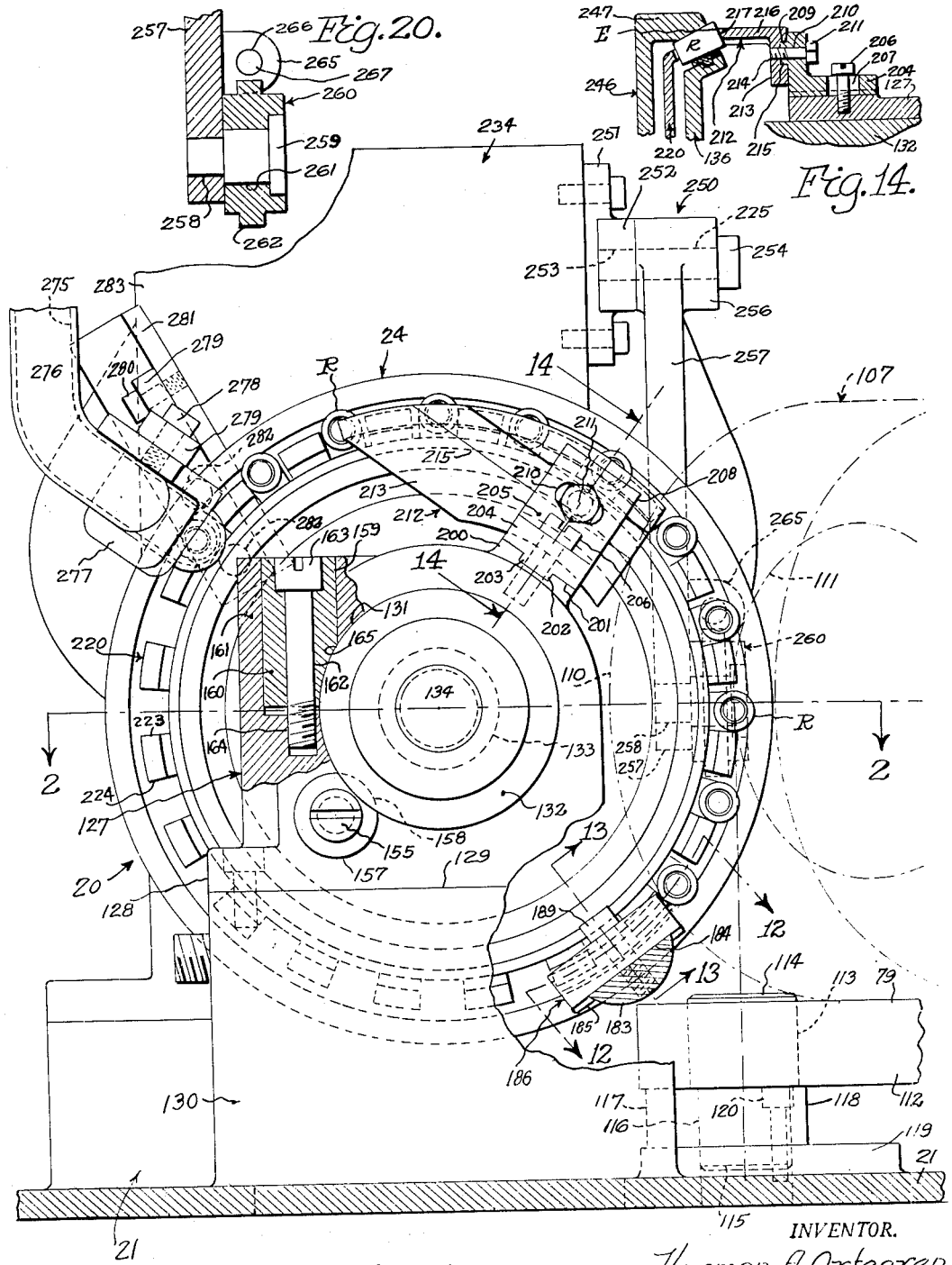
Figure 1 is a side elevation of a centerless grinder for the ends of tapered rollers, according to one form of the invention, certain portions of the machine being broken away to disclose the construction more clearly.

Tapered rollers, such as those employed between the outer and inner races of tapered roller bearings, are spherically ground on their large ends to a predetermined radius of curvature. Before the end grinding of such tapered rollers, their tapered surfaces are first rough-ground to a diameter which is held relatively to the large end of the roller. Such rollers are made in different degrees of taper for different types of bearings, most of such rollers having a taper of approximately three to four degrees, but the tapers of other rollers extend upward to eight degrees and downward to one and a half degrees included angle between the opposite edges of the roller in a plane passing through its axis of rotation or axis of symmetry. Due to the small angle of taper of such rollers, a very slight variation in the diameter of the roller has hitherto resulted in great variations in the length of such rollers when end-ground by conventional methods and machines. Expressing the matter in another way, if, as shown in the contrasting views of Figures 16 and 17, such rollers are held between driving and pressure wheels with tapered surfaces separated by a fixed gap, a larger diameter roller will project further out (Figure 16) and thus possess a greater "standout," whereas a smaller diameter roller will extend farther into the gap (Figure 17) and thus possess a lesser standout.

Accordingly, if such rollers of diameters varying by reason of variations in manufacture were end ground between such conically-tapered driving and pressure wheels with a fixed space between them, the correct amount of stock would be removed from the ends only if all of the rollers were of the same diameter relatively to the large ends. Under manufacturing conditions, however, it is impractical to attempt to hold the grinding of the diameter of the rollers to such close tolerances or limits as would be required for a substantially uniform removal of stock in the end grinding operation. Attempting to solve this problem of manufacturing variations in diameter by gauging the rollers and sorting them into groups, each lying within very close tolerances or limits as regards diameter, is expensive and insufficiently accurate, and frequent changes of position of the pressure wheel would be necessary in order to accommodate all such groups of different diameters.

The present invention solves this problem and enables a single machine to grind a wide range of diameters of such tapered rollers by permitting either the driving wheel or the pressure wheel or both wheels to yield slightly to vary the gap therebetween while the rollers are forcibly pushed into the gap so that all rollers upon arriving at the grinding wheel possess substantially the same standout or distance which they project from these wheels toward the grinding wheel. Preferably one of the wheels is provided with a laminated resiliently-mounted surface but for rollers of medium or large taper angles, a solid wheel (Figure 18) is adequate, the wheels themselves yielding sufficiently for this purpose. A backup roller is preferably provided in engagement with one of the wheels to prevent excessive deflection thereof. The rollers are forcibly pushed into the gap between the wheels by a fixed cam so as to provide them with a substantially constant standout during grinding, their small taper preventing them from pushing outward against the grinding wheel with an excessive force during grinding. By varying the pressure of the pressure wheel upon the rollers, the amount of stock removed from the ends of the rollers may be changed. As the rollers reach the lower or exit edge of the grinding wheel, they are automatically pushed away from the grinding wheel by another fixed cam which thereby prevents them from being ground away at their ends in an undesired manner at the instant they leave the grinding wheel. The rollers then drop by gravity out of the gap between the wheels.

The grinding wheel has an approximately bowl-shaped spherical surface of annular form and is rotatably mounted upon a support which is pivotable around an axis passing through the inner edge of the grinding surface of the grinding wheel. The mount of the grinding wheel is also movable toward or away from the roll driving and pressure wheels in order to compensate for grinding wheel wear. A simple adjustment enables the grinding wheel to be tilted in order to accommodate it to rollers of different spherical radii, and an improved type of grinding wheel dresser enables the spherical surface of the grinding wheel to be either trued or altered in curvature, as desired. As a result of this construction, the grinder of the present invention removes the same amount of material from the ends of rollers which differ considerably in diameter, without requiring gauging of the rollers or other special preliminary sorting or adjustments. In other words, the present invention provides a random centerless end grinder for tapered rollers.

Base and truing unit

Figure 2:
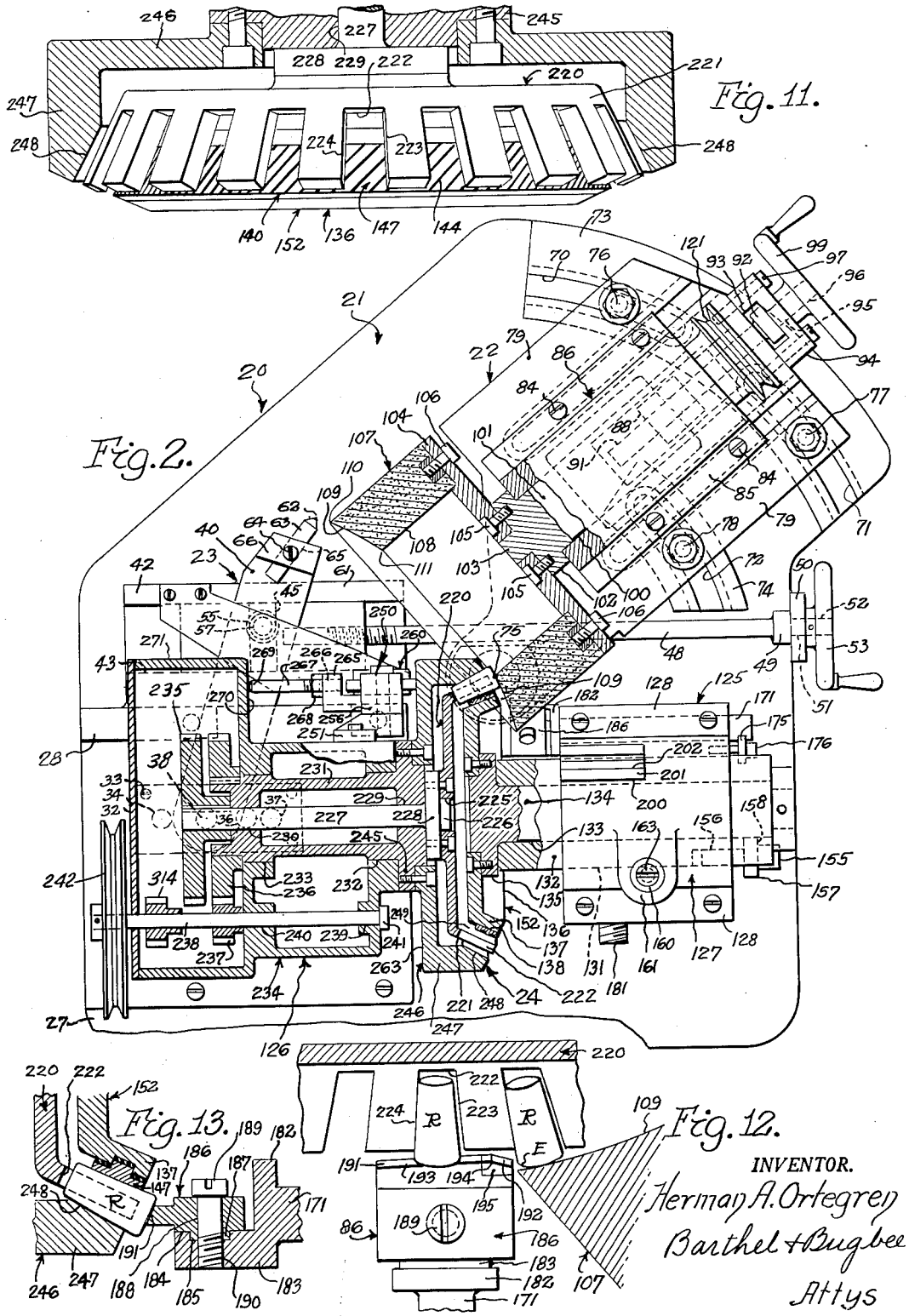
Figure 2 is a top plan view, partly in horizontal section through the axes of the various wheels.
Figure 3:
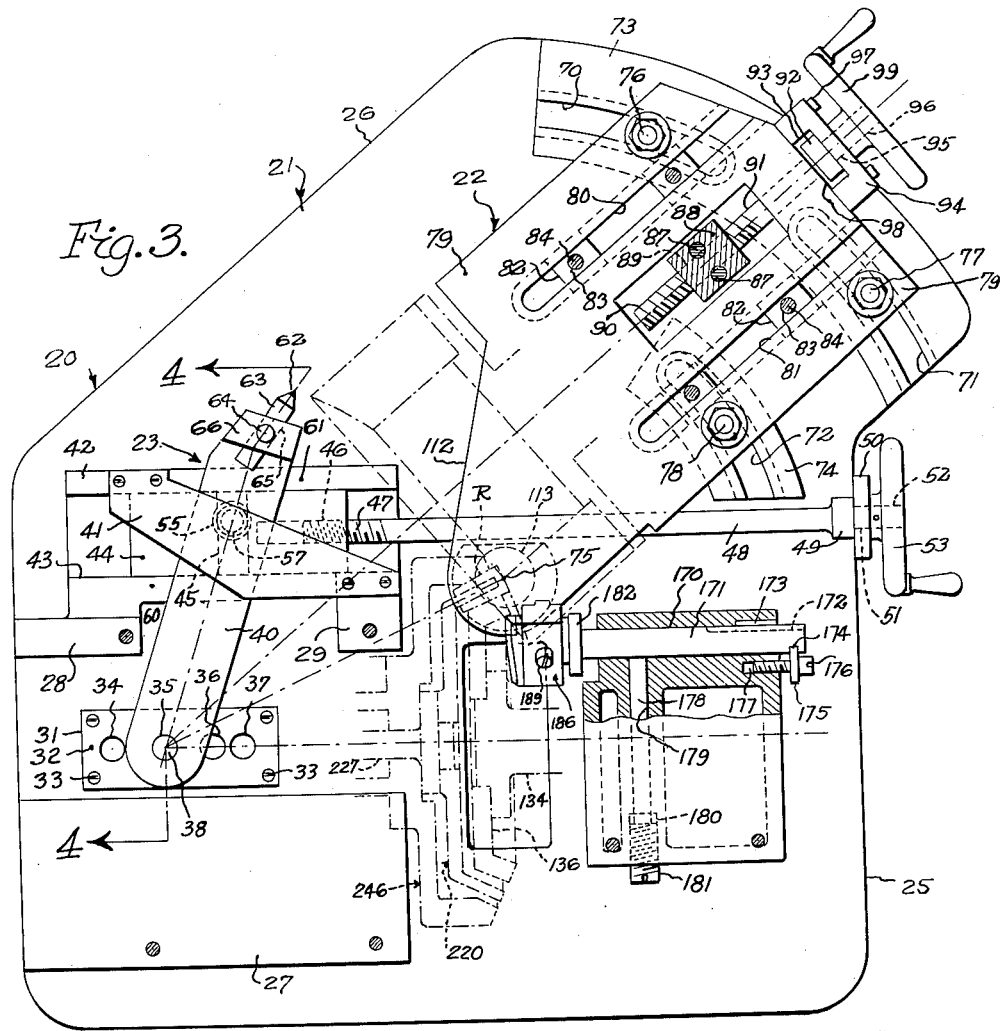
Figure 3 is a top plan view of the base of the machine shown in Figures 1 and 2, with the grinding wheel head and roller holding and driving mechanism removed to disclose the construction of the parts therebeneath.

Referring to the drawings in detail, Figures 1 to 3 inclusive show a roll end grinding machine, generally designated 20, according to one form of the invention as consisting generally of a base unit 21, a grinding unit 22, a grinding wheel dressing or truing unit 23, and a roller holding and driving unit 24, the units 22, 23 and 24 being mounted upon the base unit 21.

The base and truing units 21 and 23 (Figure 3) are mounted together and, when the machine is assembled, are at least partially covered by the other units of the machine. As shown in Figure 3 with these other units removed, the base unit 21 consists of a substantially flat casting having a rectangular portion 25 from one side of which a roughly triangular portion 26 extends outward for supporting the grinding unit 22. The base unit 21 is provided on one side with a flat-topped raised portion 27 located near the lower left-hand corner of Figure 3, and serving as a sub-base for the roller holding and driving unit 24. Spaced away from the raised portion 27 are two other flat-topped raised portions or bosses 28 and 29 which are likewise spaced apart from each other and which likewise serve to support another portion of the roller holding and driving unit 24. Formed in the base unit 21 immediately adjacent the inner edge of the raised portion 27 is a downwardly-extending boss 30 (Figure 4) having therein a rectangular recess 31 in which is seated a rectangular pivot plate 32, secured therein as at 33. The pivot plate 32 is provided with a row of pivot pin holes 34 to 37 inclusive, four being shown but a greater or lesser number being capable of use. Removably engageable with any one of the pivot pin holes 34 to 37 inclusive is a pivot pin 38 having its upper end portion tightly secured in a vertical bore 39 in a swinging grinding wheel dressing arm 40. The arm 40 and its pivot pin 38 are capable of being lifted bodily out of any one of the pivot holes 34 to 37 inclusive and being replaced by a longer or shorter dressing arm 40, according to the length of the spherical radius required on the grinding wheel.

The arm 40 near its opposite end is retained in position by an obliquely-disposed holddown plate 41 which is bolted or otherwise secured at its opposite ends to the boss 29 and a rib or elongated boss 42 spaced apart from one another in opposite sides of a guide groove or guideway 43 (Figures 3 and 4) extending partway across the base unit 21. Slidably mounted in the guideway 43 for reciprocation therein is an elongated slide block 44 of similar shape to the groove 43 and having a transverse groove 45 formed in the midportion thereof. The block 44 is provided at one end with a longitudinally-disposed threaded bore 46 in which is threaded the threaded end portion 47 of a screw shaft 48, the outer end of which is provided with an enlargement 49 abutting an upstanding lug 50 containing a bearing bore 51 through which the reduced diameter end portion 52 of the screw shaft 48 passes and in which it is journaled. Pinned or otherwise secured to the reduced diameter portion 52 of the shaft 48 is a hand wheel 53 by which the shaft 48 may be rotated and the slide block 44 accordingly moved to and fro along the groove or guideway 43.

Mounted in a vertical bore 54 in the arm 40 above the cross slot 45 is a hollow pin 55 which engages the cross slot or groove 45 to transmit motion therebetween. The hollow pin 55 is provided with a chamber 56 in which is reciprocally mounted a hollow plunger 57 urged in an upward direction by a coil spring 58 (Figure 4), the lower end of the coil spring 58 being seated against the bottom 59 of the hollow pin 55. By this action, the plunger 57 engages the undersurface of the holddown plate 41 and forces the arm 40 downward against the upper surface 60 of the base unit 21 immediately beneath the arm 40 and also against the upper surface 61 of the rib 42, precisely locating the arm 40 in its swinging motion to and fro so as to accurately limit the path of the truing or dressing diamond or other hardened crystal 62 which is mounted in the tip of a rod-like diamond holder 63 which is clamped by the set screw 64 in a bore 65 located near the upper end of the upstanding portion 66 of the arm 40.

*Grinding unit*

The base unit 21 is provided with three arcuate T-slots 70, 71 and 72 located in arcuate outer and inner bosses 73 and 74, the slots 70, 71 and 72 being centered upon a common center 75 (Figure 3). The outer slots 70 and 71 in effect form continuations of one another, although their adjacent ends are separated from one another. Mounted upon the base unit 21 and held in position by the bolts 76, 77 and 78 respectively engaging the slots 70, 71 and 72 is the grinding unit base plate 79. This in turn is provided with spaced parallel longitudinal straight T-slots 80 and 81 which are engaged by blocks 82 into the threaded bores 83 of which are threaded screws 84 passing through the laterally-extending flanges 85 of the grinding wheel head 86. Secured as by the bolts 87 (Figure 3) to the underside of the grinding wheel head 86 is a nut 88 having a threaded bore 89 through which is threaded the threaded portion 90 of a screw shaft 91 by which the grinding wheel head 86 is moved back and forth along the straight slots 80 and 81. The screw shaft 91 is provided near its outer end with an enlargement 92 by which it is held within the opening 93 in a bearing bracket 94 having a bore 95 in which the reduced diameter portion 96 of the shaft 91 is journaled. The bracket 94 is secured as by the screws 97 to the rearward end 98 of the base plate 79. Pinned or otherwise secured to the outer end of the screw shaft 91 is a hand wheel 99 by which the shaft 91 is rotated to move the nut 88 and consequently the grinding wheel head 86 back and forth along the slots 80 and 81.

The grinding wheel head 86 is provided with a longitudinal bore 100 in which is journaled a grinding wheel shaft 101. For simplicity of showing, the shaft 101 is illustrated as being journaled in the plain bearing bore 100, whereas in actual practice, anti-friction bearings are preferably used for supporting this shaft. The forward end of the shaft 101 is provided with an enlargement 102 having a reduced diameter portion 103 carrying a mounting disc 104 secured thereto as by the screws 105. Secured as by the screws 106 to the periphery of the mounting disc 104 is an annular grinding wheel 107 having a central bore 108 and an annular grinding surface 109 of spherical curvature disposed in an annular path and having outer and inner edges 110 and 111 respectively. The inner edge 111 is made to coincide with the center point 75 previously referred to and around which the grinding wheel unit base 79 swings.

In order to pivotally support the grinding wheel unit base plate 79, the forwardly-extending portion 112 thereof (Figure 3) is provided with a bore 113 (Figure 1) centered upon the center 75. Mounted in the bore 113 is a pivot pin or stud 114 having a reduced diameter portion 115 which extends downwardly into a bearing bore 116 and is journaled therein. The bearing bore 116 is formed in an approximately annular bearing block 117, one side of which is cut off as along a chord 118, the bearing block 117 being secured to a boss 119 on the base structure 21 by screws 120.

Mounted on the rearward end of the grinding wheel shaft 101 where it projects rearwardly from the grinding wheel head 86 is a pulley 121 by which the shaft 101 and consequently the grinding wheel 107 are driven, as by a belt (not shown) from a motor (also not shown).

*Roller holding and driving unit*

The roller holding and driving unit 24, shown in the lower half of Figure 2 and also in Figure 1, includes two sub-units, namely a pressure wheel sub-unit 125 and a roller holding and driving sub-unit 126 working in cooperation with one another. The sub-unit 125 consists of a head 127 having base flanges 128 bolted or otherwise secured to the flat top 129 of an upstanding boss 130. The head 127 is provided with a bore 131 in which is mounted a bearing sleeve 132 having a bearing bore 133. Journaled in the bearing bore 133, preferably with the aid of anti-friction bearings (not shown) is a pressure roller shaft 134 having on its inner end an enlargement 135 to which is bolted or otherwise secured a pressure wheel 136 having a beveled periphery 137 with a conical peripheral surface 138 which may be either plain (Figures 16 to 18 inclusive) or provided with a superimposed annular resilient layer or annular cushion, generally designated 140 (Figures 6 to 8 inclusive).

Most rollers of the tapered roller bearings in common use have comparatively small taper angles of three to four degrees of taper or less. In grinding the ends of rollers of such small taper angles, the pressure wheel 136 equipped with the annular resilient layer or cushion 140 is found advisable for reasons more fully explained in the next paragraph. For grinding the ends of rollers of a comparatively large angle of taper, such as above four degrees of taper, the resilient layer or cushion 140 may be omitted and a plain conical peripheral surface 138 used.

The resilient layer or cushion 140 is mounted in an annular peripheral groove 141 (Figure 6) in the bottom of which is mounted the bottom band portion 142 of the resilient cushion 140 with a roller-contacting outer surface 143. The cushion 140 has obliquely-disposed integral partition ribs 144 rising from the bottom band portion 142 thereof. The cushion 140 is completed by a pair of connecting or reinforcing side band portions 145 (Figure 6) spaced apart from one another on opposite sides of the annular groove 141 and interconnecting the opposite end portions of the oblique partition ribs 144 while seated against the conical peripheral surface 138. The side band portions 145, the central band portion 142 and the oblique partition ribs 144 are formed integral with one another, and together constitute an annular cushion member 146. Mounted in the spaces between the ribs 144 are elongated supporting plates or bars, generally designated 147 (Figures 9 and 10) having central lugs 148 configured to fit the groove 141 and having its sides 149 disposed obliquely to the sides 150 of the bars 147 but parallel to the oblique ends 151 thereof. The bars 147 are of such length and obliquity and the rollers R to be ground are so spaced that no two rollers contact the same bar at the same time. In this manner, two rollers R can be of slightly different diameters and yet be resiliently supported by different bars 147 on the resilient annular cushion member 146, the latter being formed of elastic deformable material, such as natural or synthetic rubber. The bars 147, annular cushion 143 and plain wheel 136 in assembly (Figures 6 to 8 inclusive) form a composite pressure wheel, generally designated 152.

In order to adjust the position of the pressure wheel 152, the sleeve 132 is capable of being moved inward or outward in the bore 131 by means of an adjusting screw 155 (Figures 1 and 2) which is threaded into a threaded bore 156 in the head 127 and is provided with an annular enlargement 157 which engages a notch or slot 158 in the sleeve 132. As a consequence, when the screw 155 is rotated in one direction or the other, the sleeve 132 is moved inward or outward, thereby moving the shaft 134 and the pressure wheel 152 inward or outward. In order to lock the sleeve 132 in its adjusted position, the head 127 is provided with a bore 159 (Figure 1) approximately tangential to the sleeve bore 131 and containing a plug 160. The bore 159 for the plug 160 is formed in a base 161 projecting laterally from the top of the head 127. The plug 160 is bored as at 162 to receive a clamping screw 163, the threaded end of which is threaded into a bore 164 at the bottom of the bore 159. The plug 160 is provided with an arcuate portion 165 configured to fit the sleeve 132 so that the latter is clamped tightly in an immovable position when the screw 163 is tightened so as to force the plug 160 downward in the bore 159.

The upstanding boss 130 is bored as at 170 in its upper portion (Figure 3) to receive a lower roller guide cam shaft 171 which is slotted as at 172 and keyed as at 173 to prevent rotation in the bore 170. The shaft 171 is also provided with a notch 174 which is engaged by the annular enlargement 175 on the head of a screw 176, the shank of which is threaded into a threaded bore 177 parallel to the shaft bore 170. As a consequence, by rotating the screw 176 in one direction or the other, the shaft 171 is moved inward or outward along the bore 170. The shaft 171 is locked in its adjusted position by a stud 178 movable to and fro in a cross bore 179 disposed perpendicular to the bore 170 and terminating at its outer end in a threaded counterbore 180. The enlarged head 181 of the stud 178 is provided with external threads and is threaded into the threaded counterbore 180. Consequently, when the stud 178 is screwed inward, it binds against the shaft 171 and locks it in position.

The inner end of the shaft 171 is provided with an enlargement 182 (Figures 3, 12 and 13) from which a cam support 183 projects forward. The cam support 183 is offset relatively to the center line of the shaft 171 and has a flat portion 184 provided with a transverse guide groove 185. Mounted on the flat surface 184 is a lower roller guide cam 186 having a guide rib 187 (Figure 13) projecting downwardly into the guide groove 185. The cam 186 is bored as at 188 to receive a screw 189, the lower end of which is threaded into a threaded bore 190 in the cam support 183. The cam 186 has a beveled edge 191 for contacting the rollers R (Figures 12 and 13) and this beveled edge 191 is inclined in oppositely-sloping edge portions 192 and 193 respectively, meeting at a ridge or high point 194. The inclined portion 192 is formed on the exposed edge of an insert 195 mounted in a notch 196 in the corner of the cam 186 and is made of a very hard material, such as tungsten carbide, in order to resist wear. The lower end 197 of the inclined portion 192 on the insert 195 terminates adjacent the outer edge 110 of the grinding wheel 107 (Figure 19) so that a roller R coming off the grinding wheel 107 immediately engages the insert edge 192 adjacent the point 197 and is directed away from the grinding surface 109 of the grinding wheel 107, as shown by the successive dotted positions of the roller R in Figure 19.

Formed on the top of the head 127 is an elongated boss 200 (Figure 1) having a flat elongated guide surface 201 inclined relatively to the horizontal, and having an elongated guide groove 202 located therein (Figure 2). Mounted on the guide surface 201 of the boss 200 and having a rib 203 engaging the guide groove 202 thereof is the base portion 204 of an angle bracket, generally designated 205. The angle bracket 205 is held in position by a clamping screw 206 (Figure 14) which passes through an elongated slot 207 in the base portion 204. The angle bracket 205 is omitted from Figure 2 in order to show the construction of its guideways 201, 202 more clearly, but is fully shown in Figures 1 and 14.

The angle bracket 205 is provided with an upstanding portion 208 having a transverse guide rib 209 and a bore 210 through which passes a cam-holding screw 211, the bore 210 being elongated (Figure 1) to permit a slight amount of adjustment of the upper roller guide cam, generally designated 212 mounted on the angle bracket 205. The cam 212 is in the form of an angle plate having a side portion 213 bored and threaded as at 214 (Figure 14) to receive the threaded end of the screw 211 and having an elongated groove 215 receiving the guide rib 209. The upper portion 216 of the cam 212 is arcuate in shape (Figures 1 and 14) and has a beveled arcuate edge 217 engageable with the end E to be ground on the roller R. The contact edge 217 of the cam 212 extends in an arcuate path up to the grinding wheel surface 109, so as to hold the rollers and push them into the desired positions as explained below.

The sub-unit 126 carries a rotary roller holder or carrier wheel, generally designated 220, having a conical or tapered periphery 221 (Figure 11) provided with peripherally-spaced notches 222 shaped to receive the rollers R and having forward and rearward contact edges 223 and 224 engageable with the rollers R at various stages in the operation of the machine. The edges 223 and 224 of the notches 222 are tapered so as to converge toward one another at substantially the same angle as the taper of the rollers R which they are to receive and hold.

Figure 22:
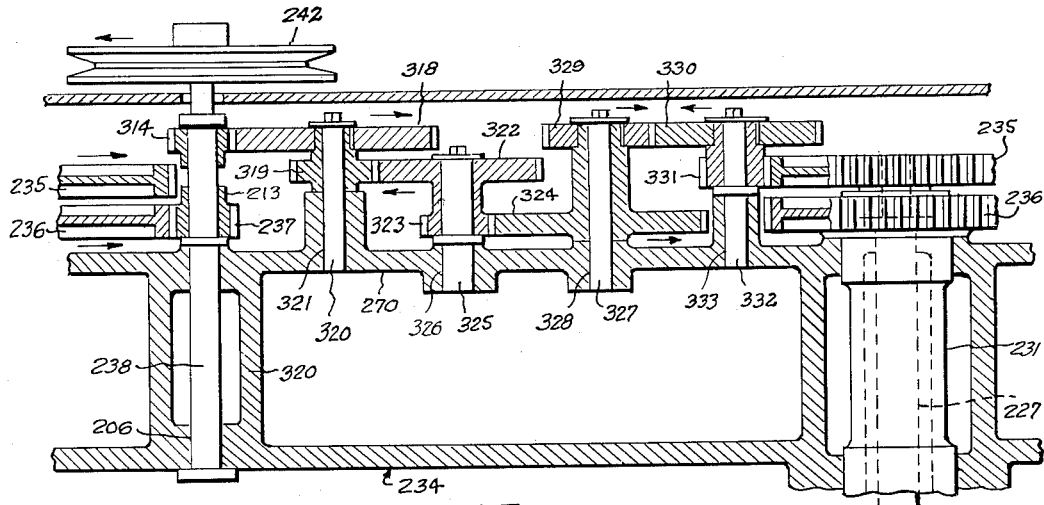
Figure 22 is a developed horizontal section through the gearing shown in Figure 21, with the gearing laid out in sequence.
Figure 21:
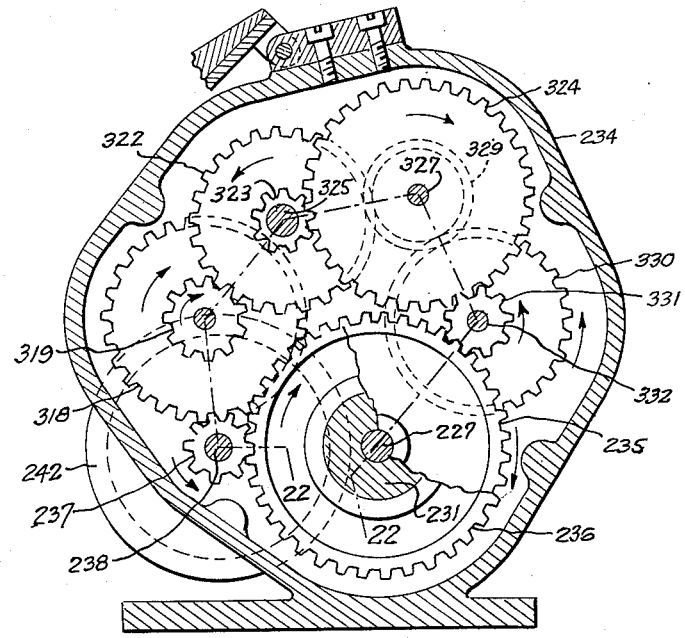
Figure 21 is a vertical section through the gear train shown at the left-hand end of Figure 2, taken immediately within the right-hand side wall of the gear box, showing the gearing interconnecting the roller holder and driving wheel.

The carrier wheel 220 at its center is bored as at 225 (Figure 2) to receive the end portion 226 of a roller carrier wheel shaft 227 having an enlargement 228 to which the carrier wheel 220 is bolted or otherwise secured. The shaft 227 is journaled in bearing bores 229 and 230 respectively in a hollow driving wheel shaft 231 which in turn is journaled in bearing bores 232 and 233 in the hollow head or housing 234 of the sub-unit 126. Keyed or otherwise drivingly secured to the outer ends of the shafts 227 and 231 are gears 235 and 236 respectively, the gear 236 meshing with a pinion 237 which is keyed or otherwise drivingly secured to a drive shaft 238 which is journaled in bearing bores 239 and 240 in the hollow head or housing 234 of the sub-unit 126. The inner end of the shaft 238 terminates in an enlargement 241 and pinned or otherwise secured to the outer end thereof is a drive pulley 242. The latter is driven by a belt from a conventional electric motor (not shown). The gears 235 and 236 mesh with and are drivingly interconnected by conventional reduction gearing, such as is shown, for example, in the Johnson Patent No. 2,434,245 issued January 13, 1948, for Grinding Machine, and is also shown in Figures 21 and 22 herein and described more fully later on in the present specification. It will suffice to state that the gears 236 and 235 are drivingly interconnected through this gearing in such a manner that the roller driving shaft 231 rotates many times faster than the roller holder shaft 227, the former, in one embodiment of the machine, rotating at 174 R. P. M. while the latter rotates at 2 R. P. M.

The roller driving wheel shaft 231 at its inner end is provided with an enlargement 245 to which is bolted or otherwise secured a roller driving wheel, generally designated 246, having an annularly flanged rim 247 containing an internally-tapered or conical annular driving surface 248 (Figures 2, 11, and 15 to 18 inclusive). The surfaces 138 of the pressure wheel 136 or 152 and the surface 248 of the driving wheel 246 are of different tapers, converging toward the shafts 227 and 231 in such a manner as to conform to the taper of the rollers R to be ground. As previously stated, the reference numeral 136 designates a plain rimmed pressure wheel (Figures 15 to 18 inclusive) and the reference numeral 152 designates a cushion-rimmed pressure wheel (Figures 6 to 8 inclusive), the latter being a plain rimmed wheel 136 equipped with the cushion layer 140. The notched inclined periphery 221 of the carrier wheel 220 projects into the tapered annular space 249 between the peripheries 137 and 247 of the pressure wheel 136 or 152 and driving wheel 246 respectively.

In order to prevent undesired deflection of the roller driving wheel 246, a supporting device, generally designated 250, is mounted as by the bracket 251 on the housing or head 234 of the sub-unit 126 (Figures 1, 2 and 20). The bracket 251 is provided with a boss 252 which is bored as at 253 to receive a pivot pin or stud 254 which passes through a bore 255 in the hub 256 at the upper end of a swinging arm 257 (Figure 1). The lower end of the arm 257 (Figure 20) is bored as at 258 to receive a pivot stud 259 upon which is mounted a supporting roll 260 bored as at 261 to receive it and having an annular contact flange 262 adapted to engage the rearward surface 263 of the roller driving wheel 246. In order to urge the contact roll 260 forcibly against the pressure wheel 246, the swinging arm 257 is provided with an angle portion 265 which is provided with a threaded horizontal bore 266 into which is threaded a stud 267 (Figure 2) having a lock nut 268 threaded thereon into engagement with the angle portion 265. The rearward end 269 of the stud 267 is adapted to engage the rearward surface 270 of the gear box portion 271 of the housing or hollow head 234 so as to thrust the swinging arm 257 firmly into contact with the rearward surface 263 of the driving wheel 246 through the intermediate contact of the roller 262.

The rollers R to be end ground are fed to the annular tapered space 249 by means of a passageway 275 in a feed tube 276 mounted at its lower end on an angle bracket 277 (Figure 1) which is secured as at 278 to the outer end of a twisted arm 279 (Figures 1 and 5), the opposite end of which is secured at 280 to a second angle bracket 281 which in turn is bolted or otherwise secured at 282 to the face 283 of the housing 234 (Figure 5). Rollers R are fed to the upper end of the passageway 275 in the tube 276 from a conventional automatic positioning or classifying device (not shown) which receives the rollers at random from a hopper (not shown) and presents them always with the small end of the roller directed downwardly in the tube 276, as shown, for example, in the Hommel Patent No. 2,490,872 issued December 13, 1949 for Article Handling Apparatus.

The driving mechanism by which the hollow roller driving wheel shaft 231 and roller carrier wheel shaft 227 are driven originates at the drive shaft 238 carrying the drive pulley 242 (Figures 2, 21 and 22). As previously stated above, the gear 236 keyed to the roller driving wheel shaft 231 is driven directly from the pinion 237 meshing therewith and keyed to the drive shaft 238.

Also mounted upon and keyed to the drive shaft 238 is a pinion 314 which meshes with and drives a gear 318 which in turn is mounted upon and keyed to the hub of a pinion 319. The pinion 319 is loosely mounted upon the stub shaft 320 which is fixedly secured in the bore 321 in the housing wall 270. The pinion 319 in turn drives the gear 322, the hub of which carries a pinion 323 driving a gear 324. The hub of the gear 322 and pinion 323 is loosely mounted upon the stub shaft 325 fixedly secured in the bore 326 in the housing wall 270. Similarly, the hub of the gear 324 is loosely mounted upon the stub shaft 327 fixedly secured in the bore 328 in the housing wall 270.

Mounted upon and keyed to the hub of the gear 324 is a pinion 329 which meshes with a gear 330 mounted upon and keyed to the hub of a pinion 331. The latter is loosely mounted upon the stub shaft 332 fixedly secured in the bore 333 in the housing wall 270 and meshes with the gear 235 mounted upon and keyed to the roller carrier wheel shaft 227, as previously described above. In this manner, the roller carrier wheel 220 is driven at a relatively slow speed compared with the roller driving wheel 246, the pressure wheel 136 not being driven, but freely rotatable in its bearings.

Operation

Prior to operating the machine of the present invention, the pressure wheel 136 or 152 is adjusted to exert the desired pressure on the rollers R by loosening the clamping screw 163 on top of the head 127 so as to release the pressure plug 160 from its clamping engagement with the sleeve 132. The adjusting screw 155 is then rotated in one direction or the other until tapered rollers of the size to be end-ground fit properly into the annular tapered space 249 (Figure 18) between the driving wheel 246 and the pressure wheel 136 or 152 and the desired pressure is exerted upon these rollers. The clamping screw 163 is then rotated to push the clamping plug 160 downward into clamping engagement with the sleeve 132, locking it in a fixed position.

The upper cam 212 (Figure 14) is then adjusted by means of the screws 206 and 211 until its contact edge 217 is placed at the desired distance from the edges of the pressure wheel 136 or 152 and driving wheel 246, so that rollers of slightly larger diameters having a greater "standout" (i. e., projection outward from the space 249) are pushed forcibly inward by the cam 212. The lower cam 186 is also adjusted so that it properly engages the large end E of the roller R (Figure 19), the instant it leaves the outer edge 110 of the grinding wheel 107, pushing the roller R away from the grinding surface 109 so that the end E is not damaged by partial grinding. This adjustment is made, as previously explained, by loosening the clamping screw or stud 181 (Figure 3), rotating the screw 176 to move the cam holding shaft 171 longitudinally, and retightening the stud 181 to lock the shaft 171 in position when this adjustment has been made.

The supporting device 250 is also adjusted so that its supporting roll 260 firmly engages the rearward surface 263 of the driving wheel 246, and is held in that position by the engagement of the end 269 of the threaded rod 267 with the housing surface or wall 270 (Figure 1).

Figure 4:
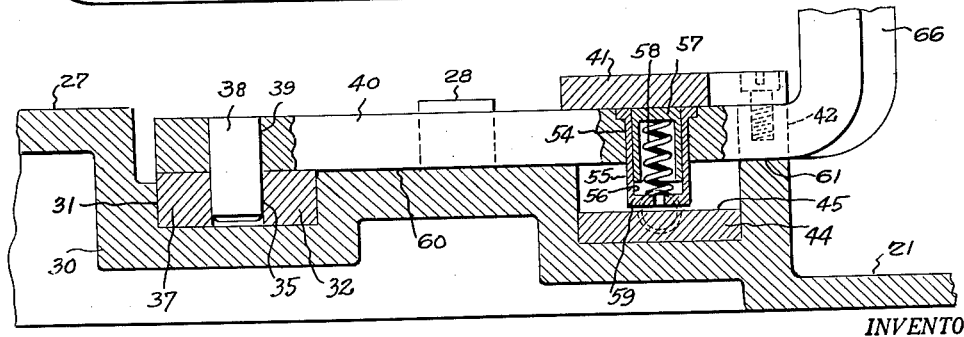
Figure 4 is a vertical section through certain of the grinding wheel truing or dressing mechanisms taken along the line 4—4 in Figure 3.

The grinding wheel 107 is properly positioned by loosening the bolts 76, 77, 78 and swinging the grinding unit 22 around the center 75 until the extended centerline of the spindle intersects the pivot point of the wheel dresser at 38 (Figure 4). The bolts 76, 77 and 78 are then tightened. The screws 84 are then loosened and the hand wheel 99 operated (Figure 2) to move the grinding wheel head 86 back and forth until the grinding surface 109 is presented at the proper distance from the pressure wheel 136 or 152 and the driving wheel 246. If the grinding surface 109 has not already been dressed or trued, this is now done by rotating the hand wheel 53 to turn the screw shaft 48 and swing the diamond or other dressing crystal 62 on the arm 40 in an arcuate path. If the diamond 62 has been set at the proper distance from the center of the pivot pin 38 corresponding to the radius of curvature which it is desired to cut on the grinding wheel 107, and if the pivot pin 38 is in the proper hole 34, 35, 36 or 37 (Figure 3), depending upon the angle of inclination of the grinding unit 22, the grinding surface 109 will have the proper curvature and location for properly grinding the large ends of the rollers R.

The foregoing adjustments having been made, the operator supplies rollers R to the machine by dumping them in the hopper (not shown) above it, whereupon the rollers are automatically positioned with their small ends directed downward and in this position fall through the passageway 275 in the feed tube 276 and on emerging from the lower end thereof pass into the space 249 between the opposing tapered surfaces 138 and 248 (Figures 15 to 18 inclusive), or between the surface 143 of the cushion layer 140 and the driving wheel surface 248 (Figures 1 and 5). In this manner, the rollers R enter the notches 222 in the carrier wheel 220 and if they project outward an excessive amount (i. e., possess an excessive standout) they are pushed forcibly inward by their immediate engagement with the contact edge 217.

Meanwhile, the two motors (not shown) of the machine have been started in operation to rotate the pulleys 121 and 242, consequently rotating the grinding wheel 107 and the roller driving wheel 246 at rapid speeds, the roller carrier wheel 220 being rotated at a very slow speed through the reduction gearing interconnecting the gears 235 and 236 on the respective shafts 227 and 231 of the carrier wheel 220 and driving wheel 246 respectively, as explained above. The rotation of the carrier wheel 220 moves the rollers R slowly toward the grinding wheel 107 while they are being rapidly rotated by their frictional contact with the driving wheel 246 (Figure 15) while engaged on the opposite sides by the freely rotating pressure wheel 136.

When the rollers are first delivered to the roller holding and driving unit 24 by the feed tube 276, they are engaged by the rearward or following edge 224 of each peripheral notch 222 in the roller carrying wheel 220, as shown at the upper left-hand side of Figure 1. As the rollers advance past the upper cam 212 and engage the grinding surface 109 of the grinding wheel 107, they are shifted into engagement with the forward or leading edges 223 of the same notches 222, as shown at the right-hand upper side of Figure 1, and also in Figures 7, 15 and 19. As the rollers are thus rapidly rotated as shown in Figure 15 while being passed across the grinding wheel surface 109, their large ends E become ground to the desired radius of curvature already imparted to the grinding wheel surface 109 and pass off the latter at the bottom of their travel. At this point (Figures 12 and 19) their freshly ground large ends E are immediately engaged at the point 197 by the inclined surface 192 of the lower cam 286 and pushed away from the grinding wheel surface 109, thereby preventing damage to the ends E. The rollers R, after being thus pushed away, continue to travel downward while their large ends E engage the inclined surface 193 after passing over the dividing point 194 (Figure 19) and drop by gravity into a suitable chute (not shown) when they reach the end of the cam 186.

The operation of the modified form of the invention of Figures 16 to 18 inclusive employing a pressure wheel 136 with a plain roller-engaging surface 138 instead of the cushioned surface 143 of the cushion layer 140 (Figure 7) is substantially identical with the operation described above. As previously stated, the plain rimmed wheel 136 with the uncushioned surface 138 may be used for rollers of large angles of taper where the standout of the roller is not so critical, there being sufficient "spring" to the two wheels 136 and 246 to permit excessive diameter rollers R to be pushed forcibly into the space 249 by the upper cam 212 so as to give all of the rollers R the same projection distance or "standout" as in the case of the resilient pressure wheel 152.

Thus, with the machine of the present invention, the driving wheel and pressure wheel may be of smaller diameter even though the radius of curvature to be ground upon the ends of the rollers is large, because the roller is held between internal and external conical surfaces on the driving wheel and pressure wheel respectively, these surfaces facing laterally rather than toward a plane perpendicular to the axis of rotation, as in prior end grinding machines employing driving and pressure discs arranged side by side and having oppositely-flared conical roller-engaging surfaces converging in opposite directions toward the axis of rotation. In such prior machines, the diameters of these discs were necessarily approximately the diameter of the "roll circle" or circle having a diameter equal to the diameter of curvature of the surface to be ground on the ends of the rollers, and when the end surfaces had a shallow curvature or a large radius of curvature, the driving disc and pressure disc became of large and unwieldy dimensions.

When the grinding surface 109 of the grinding wheel 107 has become worn so that it requires retruing, or when the grinding surface 109 is to be cut to a different radius, a dressing arm 40 with the desired radius from the center of the pin 38 to the tip of the diamond 62 is inserted in the proper hole 34, 35, 36 or 37 and the grinding wheel 107 moved up into engagement with the diamond 62 as the arm 40 is swung in an arc to pass the diamond 62 across the annular grinding surface 109. The grinding wheel 107 is moved up into engagement with the diamond 62 by turning the hand wheel 99 and consequently moving the grinding wheel head 86. When the radius of curvature of the spherical surface upon the end E of the roller R is changed, a dressing arm 40 of different radius may be used, and placed in a different one of the holes 34, 35, 36 or 37. The tip of the diamond 62 is set to the proper radius from the center of the pin 38 by means of a gauge (not shown). Thus, the pivot pin 38 of the grinding wheel dressing arm 40 does not have to be shifted in position to redress a grinding wheel. In practice, when a spherical surface of a different radius of curvature is to be ground on the rollers R, a set of wheels including different pressure and driving wheels 152 and 246 with differently angled conical contact surfaces 143 or 138 and 248 is provided, together with a different carrier wheel 220 having different-sized notches 222 therein.

The construction of the machine 20 is such that the axis of the roller R, the end of which is being ground, coincides with the point or axis 75, the pivot axis of the pivot pin or stud 114 which pivotally supports the grinding wheel unit base plate 79, and the point or axis 75 is also caused to coincide with the inner edge 111 of the grinding wheel surface 109. Accordingly, as the axes or centers of the ends E of the rollers R move down across the face of the grinding wheel 107, they follow an arcuate path the outer ends of which extend between different locations on the outer edge 110 of the wheel 107, whereas the midportion of this arcuate path passes through the point 75 on the inner edge 111 of the grinding wheel 107. This construction insures that the rollers cover the entire grinding surface 109 as the wheel 107 revolves, so that wear thereon takes place substantially evenly over the entire surface 109 and in this respect the wheel 107 is said to be self-dressing. If the path of travel of the centers of the roller ends E did not intersect both the outer and inner edges 110 and 111 of the grinding wheel surface 109, the wheel would not wear evenly and a ridge would form which would not only distort the ends of rollers of slightly varying diameters but would also require more frequent redressing of the wheel. This is the reason why the point or axis 75 is located at the inner edge 111 of the grinding wheel surface 109 and also at the center or axis of the rollers R to be ground.

What I claim is:

1. A machine for end-grinding tapered rollers, comprising a rotary grinder, a rotary roller carrier wheel thinner than said rollers and having peripheral roller holding recesses open laterally and peripherally to expose the sides and outer ends respectively of said rollers, said carrier wheel being positioned to move said outer ends of said rollers across said grinder, a rotary driving wheel mounted on one side of said carrier wheel and having an annular internally-tapered peripheral surface drivingly engageable with the exposed sides of said rollers for rotating said rollers about their longitudinal axes while being moved across said grinder, a rotary pressure wheel mounted on the other side of said carrier wheel and having an annular externally-tapered peripheral surface engageable with the opposite exposed sides of said rollers for urging them into engagement with said driving wheel, said internally-tapered peripheral surface being spaced outwardly from and converging toward said externally-tapered peripheral surface, and power-transmitting mechanism drivingly connecting said driving wheel to said carrier wheel.

2. A machine for end-grinding tapered rollers, comprising a rotary grinder, a rotary roller carrier wheel thinner than said rollers and having a tapered annular periphery with peripheral roller holding recesses open laterally and peripherally to expose the sides and outer ends respectively of said rollers, said carrier wheel being positioned to move said outer ends of said rollers across said grinder, a rotary driving wheel mounted on one side of said carrier wheel and having an annular internally-tapered peripheral surface drivingly engageable with the exposed sides of said rollers for rotating said rollers about their longitudinal axes while being moved across said grinder, a rotary pressure wheel mounted on the other side of said carrier wheel and having an annular externally-tapered peripheral surface engageable with the opposite exposed sides of said rollers for urging them into engagement with said driving wheel, said internally-tapered peripheral surface being spaced outwardly from and converging toward said externally-tapered peripheral surface, and power-transmitting mechanism drivingly connecting said driving wheel to said carrier wheel.

3. A machine for end-grinding tapered rollers, comprising a rotary grinder, a rotary roller carrier wheel thinner than said rollers and having peripheral roller holding recesses open laterally and peripherally to expose the sides and outer ends respectively of said rollers, said carrier wheel being positioned to move said outer ends of said rollers across said grinder, a rotary driving wheel mounted on one side of said carrier wheel and having an annular internally-tapered peripheral surface drivingly engageable with the exposed sides of said rollers for rotating said rollers about their longitudinal axes while being moved across said grinder, a rotary pressure wheel mounted on the other side of said carrier wheel and having an annular externally-tapered peripheral surface engageable with the opposite exposed sides of said rollers for urging them into engagement with said driving wheel, power-transmitting mechanism drivingly connecting said driving wheel to said carrier wheel, and a guide member disposed adjacent the tapered roller-receiving opening between said driving and pressure wheels, said guide member having a forward edge portion flared away from said wheels and inclined toward the remainder of its edge and engageable with the ends of said rollers to urge said rollers into said opening.

4. A machine for end-grinding tapered rollers, comprising a rotary grinder, a rotary roller carrier wheel thinner than said rollers and having peripheral roller holding recesses open laterally and periperally to expose the sides and outer ends respectively of said rollers, said carrier wheel being positioned to move said outer ends of said rollers across said grinder, a rotary driving wheel mounted on one side of said carrier wheel and having an annular internally-tapered peripheral surface drivingly engageable with the exposed sides of said rollers for rotating said rollers about their longitudinal axes while being moved across said grinder, a rotary pressure wheel mounted on the other side of said carrier wheel and having an annular externally-tapered peripheral surface engageable with the opposite exposed sides of said rollers for urging them into engagement with said driving wheel, power-transmitting mechanism drivingly connecting said driving wheel to said carrier wheel, and a guide member disposed adjacent the tapered roller-receiving opening between said driving and pressure wheels at the location of approach of said rollers to said grinder, said guide member having a forward edge portion flared away from said wheels and inclined toward the remainder of its edge and engageable with the ends of said rollers to urge said rollers into said opening.

5. A machine for end-grinding tapered rollers, comprising a rotary grinder, a rotary roller carrier wheel thinner than said rollers and having peripheral roller holding recesses open laterally and peripherally to expose the sides and outer ends respectively of said rollers, said carrier wheel being positioned to move said outer ends of said rollers across said grinder, a rotary driving wheel mounted on one side of said carrier wheel and having an annular internally-tapered peripheral surface drivingly engageable with the exposed sides of said rollers for rotating said rollers about their longitudinal axes while being moved across said grinder, a rotary pressure wheel mounted on the other side of said carrier wheel and having an annular externally-tapered peripheral surface engageable with the opposite exposed sides of said rollers for urging them into engagement with said driving wheel, power-transmitting mechanism drivingly connecting said driving wheel to said carrier wheel, and a roller-expelling member disposed beyond said grinder at the location of departure of said rollers from said grinder, said roller-expelling member having a leading edge portion disposed angularly to the remainder thereof and inclined away from said grinder and engageable with said rollers to urge said rollers away from said grinder into engagement with said remainder of said edge.

6. A machine for end-grinding tapered rollers, comprising a rotary grinder, a rotary roller carrier wheel thinner than said rollers and having peripheral roller holding recesses open laterally and peripherally to expose the sides and outer ends respectively of said rollers, said carrier wheel being positioned to move said outer ends of said rollers across said grinder, a rotary driving wheel mounted on one side of said carrier wheel and having an annular internally-tapered peripheral surface drivingly engageable with the exposed sides of said rollers for rotating said rollers about their longitudinal axes while being moved across said grinder, a rotary pressure wheel mounted on the other side of said carrier wheel and having an annular externally-tapered peripheral surface engageable with the opposite exposed sides of said rollers for urging them into engagement with said driving wheel, power-transmitting mechanism drivingly connecting said driving wheel to said carrier wheel, a guide member disposed adjacent the tapered roller-receiving opening between said driving and pressure wheels, said guide member having a forward edge portion flared away from said wheels and inclined toward the remainder of its edge and engageable with the ends of said rollers to urge said rollers into said opening, and a roller-expelling member disposed beyond said grinder at the location of departure of said rollers from said grinder, said roller-expelling member having a leading edge portion disposed angularly to the remainder thereof and inclined away from said grinder and engageable with said rollers to urge said rollers away from said grinder into engagement with said remainder of said edge.

7. A machine for end-grinding tapered rollers, comprising a rotary grinder, a rotary roller carrier wheel thinner than said rollers and having peripheral roller holding recesses open laterally and peripherally to expose the sides and outer ends respectively of said rollers, said carrier wheel being positioned to move said outer ends of said rollers across said grinder, a rotary driving wheel mounted on one side of said carrier wheel and having an annular internally-tapered peripheral surface drivingly engageable with the exposed sides of said rollers for rotating said rollers about their longitudinal axes while being moved across said grinder, a rotary pressure wheel mounted on the other side of said carrier wheel and having an annular externally-tapered peripheral surface engageable with the opposite exposed sides of said rollers for urging them into engagement with said driving wheel, and power-transmitting mechanism drivingly connecting said driving wheel to said carrier wheel, said grinder having an annular concave spherically-curved grinding surface thereon and said grinder being pivotally mounted to swing around an axis passing through one edge of said grinding surface.

8. A machine for end-grinding tapered rollers, comprising a rotary grinder, a rotary roller carrier wheel thinner than said rollers and having peripheral roller holding recesses open laterally and peripherally to expose the sides and outer ends respectively of said rollers, said carrier wheel being positioned to move said outer ends of said rollers across said grinder, a rotary driving wheel mounted on one side of said carrier wheel and having an annular internally-tapered peripheral surface drivingly engageable with the exposed sides of said rollers for rotating said rollers about their longitudinal axes while being moved across said grinder, a rotary pressure wheel mounted on the other side of said carrier wheel and having an annular externally-tapered peripheral surface engageable with the opposite exposed sides of said rollers for urging them into engagement with said driving wheel, and power-transmitting mechanism drivingly connecting said driving wheel to said carrier wheel, said grinder having an annular concave spherically-curved grinding surface thereon and said grinder being pivotally mounted to swing around an axis passing through the inner edge of said grinding surface.

9. A machine for end-grinding tapered rollers, comprising a rotary grinder, a rotary roller carrier wheel thinner than said rollers and having peripheral roller holding recesses open laterally and peripherally to expose the sides and outer ends respectively of said rollers, said carrier wheel being positioned to move said outer ends of said rollers across said grinder, a rotary driving wheel mounted on one side of said carrier wheel and having an annular internally-tapered peripheral surface drivingly engageable with the exposed sides of said rollers for rotating said rollers about their longitudinal axes while being moved across said grinder, a rotary pressure wheel mounted on the other side of said carrier wheel and having an annular externally-tapered peripheral surface engageable with the opposite exposed sides of said rollers for urging them into engagement with said driving wheel, power-transmitting mechanism drivingly connecting said driving wheel to said carrier wheel, and a rotary wheel-back-up element engaging one of said wheels in opposition to the direction of thrust of said rollers thereagainst.

10. A machine for end-grinding tapered rollers, comprising a rotary grinder, a rotary roller carrier wheel thinner than said rollers and having peripheral roller holding recesses open laterally and peripherally to expose the sides and outer ends respectively of said rollers, said carrier wheel being positioned to move said outer ends of said rollers across said grinder, a rotary driving wheel mounted on one side of said carrier wheel and having an annular internally-tapered peripheral surface drivingly engageable with the exposed sides of said rollers for rotating said rollers about their longitudinal axes while being moved across said grinder, a rotary pressure wheel mounted on the other side of said carrier wheel and having an annular externally-tapered peripheral surface engageable with the opposite exposed sides of said rollers for urging them into engagement with said driving wheel, power-transmitting mechanism drivingly connecting said driving wheel to said carrier wheel, a rotary wheel-back-up element holder movably mounted for motion toward and away from one of said wheels, and a rotary wheel-back-up element connected to said rotary element holder and engaging one of said wheels in opposition to the direction of thrust of said rollers thereagainst.

11. A machine for end-grinding tapered rollers, comprising a rotary grinder, a rotary roller carrier wheel thinner than said rollers and having peripheral roller holding recesses open laterally and peripherally to expose the sides and outer ends respectively of said rollers, said carrier wheel being positioned to move said outer ends of said rollers across said grinder, a rotary driving wheel mounted on one side of said carrier wheel and having an annular tapered peripheral surface drivingly engageable with the exposed sides of said rollers for rotating the rollers about their longitudinal axes while being moved across said grinder, a rotary pressure wheel mounted on the other side of said carrier wheel and having an annular tapered peripheral surface engageable with the opposite exposed sides of said rollers for urging them into engagement with said driving wheel, power-transmitting mechanism drivingly connecting said driving wheel to said carrier wheel, a resilient annular layer disposed on the roller-engaging surface of one of said wheels, and a multiplicity of independently-movable roller-engaging members disposed in side-by-side relationship upon said layer around the circumference thereof.

12. A machine for end-grinding tapered rollers, comprising a rotary grinder, a rotary roller carrier wheel thinner than said rollers and having peripheral roller holding recesses open laterally and peripherally to expose the sides and outer ends respectively of said rollers, said carrier wheel being positioned to move said outer ends of said rollers across said grinder, a rotary driving wheel mounted on one side of said carrier wheel and having an annular tapered peripheral surface drivingly engageable with the exposed sides of said rollers for rotating the rollers about their longitudinal axes while being moved across said grinder, a rotary pressure wheel mounted on the other side of said carrier wheel and having an annular tapered peripheral surface engageable with the opposite exposed sides of said rollers for urging them into engagement with said driving wheel, power-transmitting mechanism drivingly connecting said driving wheel to said carrier wheel, a resilient annular layer disposed on the roller-engaging surface of one of said wheels, and a multiplicity of independently-movable roller-engaging members disposed in side-by-side relationship obliquely across said layer around the circumference thereof.

13. A machine for end-grinding tapered rollers, comprising a rotary grinder, a rotary roller carrier wheel thinner than said rollers and having peripheral roller holding recesses open laterally and peripherally to expose the sides and outer ends respectively of said rollers, said carrier wheel being positioned to move said outer ends of said rollers across said grinder, a rotary driving wheel mounted on one side of said carrier wheel and having an annular tapered peripheral surface drivingly engageable with the exposed sides of said rollers for rotating the rollers about their longitudinal axes while being moved across said grinder, a rotary pressure wheel mounted on the other side of said carrier wheel and having an annular tapered peripheral surface engageable with the opposite exposed sides of said rollers for urging them into engagement with said driving wheel, power-transmitting mechanism drivingly connecting said driving wheel to said carrier wheel, a resilient annular layer disposed on the roller-adjacent surface of one of said wheels, and a multiplicity of independently movable roller-engaging members mounted in circumferentially-spaced side-by-side relationship on said annular layer around the circumference thereof, said resilient layer protruding into the spaces between said roller-engaging members.

14. A machine for end-grinding tapered rollers, comprising a rotary grinder, a rotary roller carrier wheel thinner than said rollers and having peripheral roller holding recesses open laterally and peripherally to expose the sides and outer ends respectively of said rollers, said carrier wheel being positioned to move said outer ends of said rollers across said grinder, a rotary driving wheel mounted on one side of said carrier wheel and having an annular internally-tapered peripheral surface drivingly engageable with the exposed sides of said rollers for rotating said rollers about their longitudinal axes while being moved across said grinder, a rotary pressure wheel mounted on the other side of said carrier wheel and having an annular externally-tapered peripheral surface engageable with the opposite exposed sides of said rollers for urging them into engagement with said driving wheel, said internally-tapered peripheral surface being spaced outwardly from and converging toward said externally-tapered peripheral surface, and power-transmitting mechanism drivingly connecting said wheel to said carrier wheel, said grinder having an annular concave spherically-curve grinding surface thereon and said grinder being pivotally mounted to swing around an axis passing through one edge of said grinding surface, said annular peripheral roller-engaging surfaces of said driving wheel and pressure wheel being so tapered and positioned that the axis of rotation of a roller therebetween being ground on said grinder passes through said grinder pivot axis at said one edge of said grinding surface and also passes through the center of curvature of said grinding surface.

References Cited in the file of this patent

UNITED STATES PATENTS

| | | |
|---|---|---|
| 535,794 | Grant | Mar. 12, 1895 |
| 891,992 | Hess | June 30, 1908 |
| 1,122,433 | Smith | Dec. 29, 1914 |
| 1,662,672 | Hoke | Mar. 13, 1928 |
| 1,791,713 | Caster et al. | Feb. 10, 1931 |
| 1,878,116 | Deutsch | Sept. 20, 1932 |
| 2,024,118 | Vanderbeek | Dec. 10, 1935 |
| 2,109,600 | Vanderbeek | Mar. 1, 1938 |
| 2,218,982 | Cramer | Oct. 22, 1940 |
| 2,341,825 | Spicacci | Feb. 15, 1944 |
| 2,434,245 | Johnson | Jan. 13, 1948 |
| 2,437,002 | Riedling | Mar. 2, 1948 |
| 2,482,485 | Hutchinson | Sept. 20, 1949 |
| 2,551,568 | Roshong | May 1, 1951 |
| 2,586,953 | Johnson | Feb. 26, 1952 |